(12) United States Patent
Bin et al.

(10) Patent No.: US 9,547,504 B2
(45) Date of Patent: Jan. 17, 2017

(54) IMAGE FORMING APPARATUS, METHOD OF CONNECTING WITH EXTERNAL DEVICE THEREOF, AND COMPUTER-READABLE RECORDING MEDIUM

(71) Applicant: Samsung Electronics Co., Ltd, Suwon-si, Gyeonggi-do (KR)

(72) Inventors: Sung-uk Bin, Suwon-si (KR); Ho-beom Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/933,149

(22) Filed: Jul. 2, 2013

(65) Prior Publication Data
US 2014/0198331 A1 Jul. 17, 2014

(30) Foreign Application Priority Data
Jan. 17, 2013 (KR) .................. 10-2013-0005388

(51) Int. Cl.
G06F 3/12 (2006.01)
G06K 15/00 (2006.01)
G06F 9/44 (2006.01)
G06F 1/32 (2006.01)

(52) U.S. Cl.
CPC .......... *G06F 9/4418* (2013.01); *G06F 1/3284* (2013.01); *Y02B 60/1267* (2013.01); *Y02B 60/186* (2013.01)

(58) Field of Classification Search
USPC ....................................................... 358/1.15
See application file for complete search history.

(56) References Cited

U.S. PATENT DOCUMENTS

| 6,903,830 B1 | 6/2005 | Hane et al. | |
| 7,765,413 B2 | 7/2010 | Senda | |
| 2002/0134268 A1* | 9/2002 | Yamada | ........................ 101/484 |

(Continued)

FOREIGN PATENT DOCUMENTS

| EP | 1035499 | 9/2000 |
| EP | 1909474 | 4/2008 |

(Continued)

OTHER PUBLICATIONS

PCT Search Report and Written Opinion issued in Application No. PCT/KR2013/006423 on Dec. 10, 2013.

(Continued)

*Primary Examiner* — Huo Long Chen
(74) *Attorney, Agent, or Firm* — Staas & Halsey LLP

(57) ABSTRACT

An image forming apparatus that includes a first storage where a first program to communicate with an external interface is stored when the image forming apparatus is in a normal mode, a second storage where a second program which is smaller than the first program in size is stored in order to perform communication with a pre-defined external device through the external interface when the image forming apparatus is in a power saving mode, and a controller which performs communication with the external interface using the first program stored in the first storage or the second program stored in the second storage according to an operation mode of the image forming apparatus.

25 Claims, 9 Drawing Sheets

(56) References Cited

U.S. PATENT DOCUMENTS

| | | | | |
|---|---|---|---|---|
| 2005/0005076 | A1* | 1/2005 | Lasser | G06F 8/60 711/154 |
| 2005/0108547 | A1* | 5/2005 | Sakai | 713/182 |
| 2006/0010331 | A1* | 1/2006 | Ohara | 713/323 |
| 2007/0063991 | A1* | 3/2007 | Lee | G06F 1/3203 345/173 |
| 2007/0260358 | A1* | 11/2007 | Katoh | B41J 29/393 700/286 |
| 2009/0199022 | A1* | 8/2009 | Fukuda | G06F 1/3203 713/300 |
| 2010/0235775 | A1 | 9/2010 | Sugimoto | |
| 2011/0058214 | A1* | 3/2011 | Park et al. | 358/1.15 |
| 2011/0060929 | A1 | 3/2011 | Park et al. | |
| 2012/0133971 | A1 | 5/2012 | Park | |

FOREIGN PATENT DOCUMENTS

| | | |
|---|---|---|
| EP | 2299677 | 3/2011 |
| EP | 2302520 | 3/2011 |
| EP | 2312405 | 4/2011 |
| EP | 2437180 | 4/2012 |
| EP | 2544426 | 1/2013 |
| JP | 2000-326590 | 11/2000 |
| JP | 2004-122551 | 4/2004 |
| JP | 2007-068156 | 3/2007 |
| JP | 2010-277258 | 12/2010 |
| KR | 2011-0027545 | 3/2011 |
| WO | 2007-013512 | 2/2007 |

OTHER PUBLICATIONS

Extended European Search Report issued in Application No. 14151120.4 on Jun. 18, 2014.
Ravi Subramanian: "Wi-Fi Connectivity—Simple and Easy", Oct. 25, 2012 (Oct. 25, 2012), pp. 1-36, XP055122021, Retrieved from the Internet: URL:http://www.renesasinteractive.com/file.php/1/CoursePDFs/DevCon_2012/M2M_Cloud/8C05I_Gainspan_WiFiConnectivity.pdf [retrieved on Jun. 5, 2014].
Turkish Examination Report dated Jun. 9, 2016 from Turkish Patent Application No. 2015/05939, 8 pages.

* cited by examiner

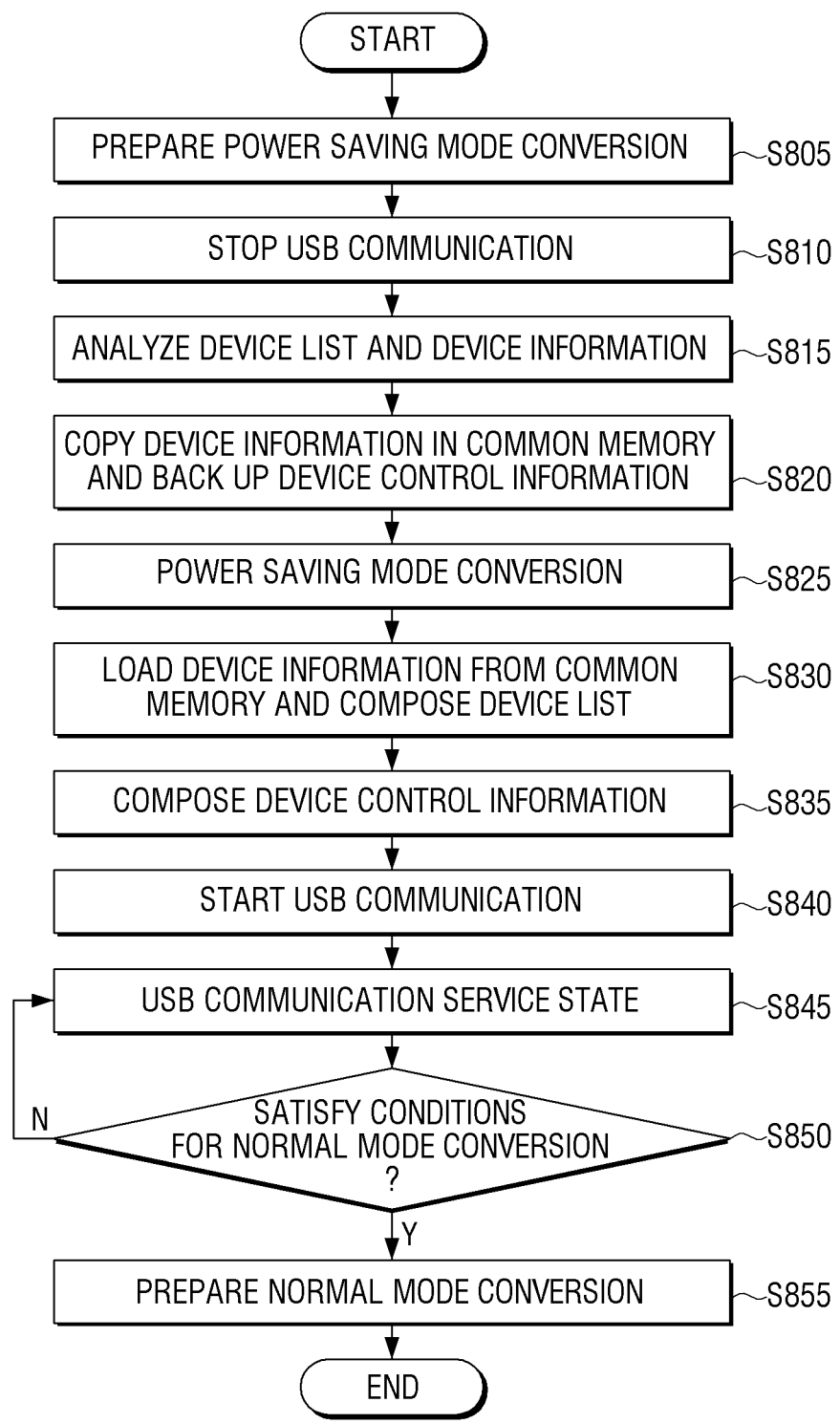

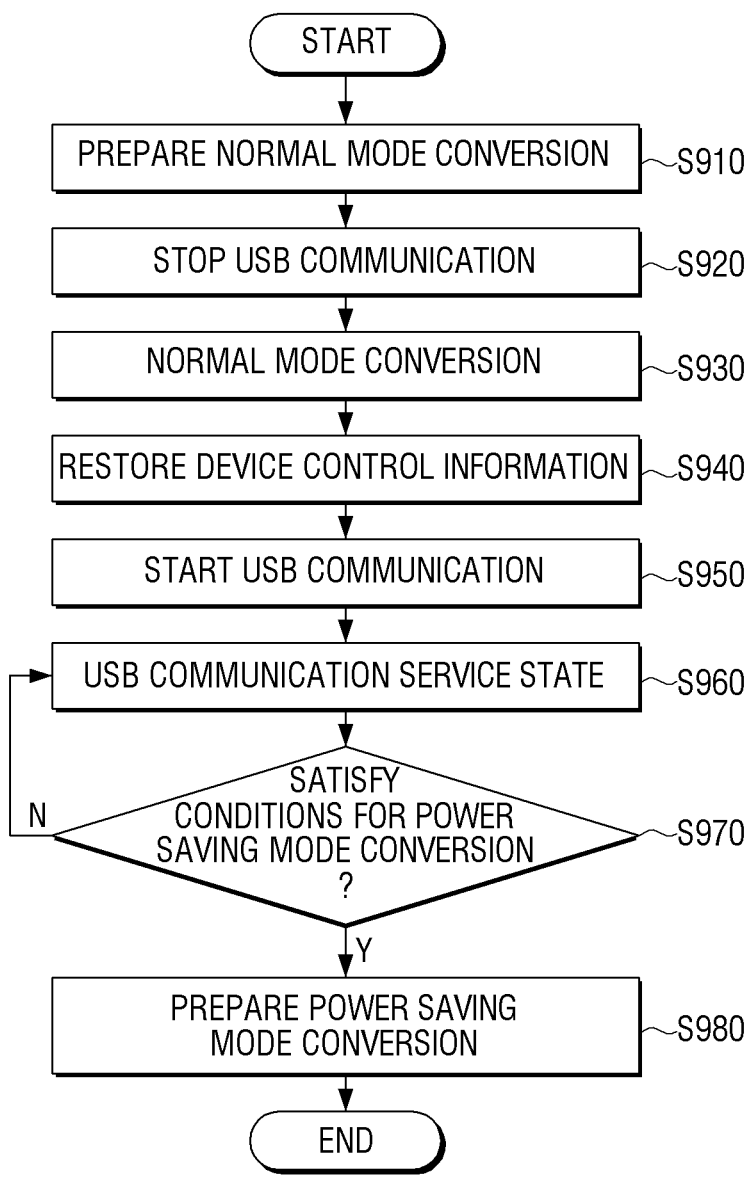

IMAGE FORMING APPARATUS, METHOD OF CONNECTING WITH EXTERNAL DEVICE THEREOF, AND COMPUTER-READABLE RECORDING MEDIUM

CROSS-REFERENCE TO RELATED APPLICATIONS

This application claims priority from Korean Patent Application No. 10-2013-0005388, filed in the Korean Intellectual Property Office on Jan. 17, 2013, the disclosure of which is incorporated herein by reference in its entirety.

BACKGROUND OF THE INVENTION

1. Field of the Invention

Exemplary embodiments relate to an image forming apparatus, a method of connecting with an external device thereof, and a computer-readable recording medium, and more particularly, to an image forming apparatus which is capable of communicating with an external device using different programs according to an operation mode, a method of connecting with an external device thereof, and a computer-readable recording medium.

2. Description of the Related Art

An image forming apparatus is an apparatus which generates, prints, receives, or transmits image data, and examples of an image forming apparatus include a printer, a scanner, a copy machine, a fax machine, and a Multi-Function Peripheral (MFP) which performs the above functions in a single device.

Recently, in order to save power consumption in a power saving mode, an image forming apparatus cuts off power supply to a main memory (generally, Dynamic Random Access Memory (DRAM)) or converts a mode to a self-refresh state, and uses a separate memory (generally, Static Random Access Memory (SRAM)) to drive a program.

However, a USB host which needs to support various kinds of functions and apparatuses requires a larger space for a stack (a USB host program) as the number of functions and apparatuses supported by the USB host increases and thus, it is difficult to realize all functions of the USB host using a SRAM which has a relatively small capacity. In addition, it is not cost-effective to use an expensive SRAM when a large capacity is required.

Recently, with the development of wireless data communication technology, a wireless LAN module has been applied to various apparatuses, and a wireless LAN module using a USB interface has been used widely in consideration of compatibility with various host devices. However, when an image forming apparatus enters into a power saving mode, power supply to a main memory is cut off and an operation of a USB driver in the main memory stops, and thus it is impossible to communicate with a USB device such as a USB wireless LAN module.

In particular, when a specific job command is transmitted wirelessly as in the case of a wireless printer, it is impossible to output a document even if a print control terminal apparatus (for example, PC, notebook, etc.) transmits data to output the document wirelessly.

SUMMARY OF THE INVENTION

Exemplary embodiments relate to an image forming apparatus which is capable of communicating with an external device using different programs depending on an operation mode, a network connecting method thereof, and a computer-readable recording medium.

Additional features and utilities of the present general inventive concept will be set forth in part in the description which follows and, in part, will be obvious from the description, or may be learned by practice of the general inventive concept.

An image forming apparatus which operates in a plurality of operation modes according to an exemplary embodiment includes a first storage where a first program to communicate with external interface is stored when the image forming apparatus is in a normal mode, a second storage where a second program which is smaller than the first program in size is stored in order to perform communication with a pre-defined external device through the external interface when the image forming apparatus is in a power saving mode, and a controller which performs communication with the external interface using the first program stored in the first storage and the second program stored in the second storage according to an operation mode of the image forming apparatus.

The controller, when the image forming apparatus is in a normal mode, may perform communication with the external interface using the first program stored in the first storage, and the controller, when the image forming apparatus is in a power saving mode, may perform communication with the external device using the second program stored in the second storage.

The apparatus may further include a determination unit which determines whether an external device is connected to the external interface, and the controller, when an external device is determined to be connected to the external interface, may store the second program in the second storage when an operation mode of the image forming apparatus is converted to a power saving mode.

The determination unit, when an external device is connected to the external interface, may determine whether the connected external device is the pre-defined external device, and the controller, when the connected external device is determined to be a pre-defined external device, may operate the second program stored in the second storage when an operation mode of the image forming apparatus is converted to a power saving mode.

The controller, when the connected external device is determined to be a pre-defined external device, may store device information of the connected external device in the second storage when an operation mode of the image forming apparatus is converted to a power saving mode.

The controller, when the image forming apparatus is in a power saving mode, may perform communication with the external device using device information of an external device stored in the second storage and the second program.

The determination unit may perform an operation when the image forming apparatus is in a normal mode.

The controller, when the image forming apparatus is in a power saving mode, may cut off power to the first storage, or control to operate the first storage in a self-refresh mode.

The apparatus may further include a third storage which is non-volatile and stores the first program and the second program, and the controller, when an operation mode of the image forming apparatus is converted to a power saving mode, may stop communication with the external interface, store the second program stored in the third storage in the second storage, and resume communication with the external interface using the second program stored in the second storage.

The controller, when an operation mode of the image forming apparatus is converted to a power saving mode, may back up device control information of an external device connected to the external interface in the first storage or the second storage.

The controller, when an operation mode of the image forming apparatus is converted to a normal mode, may compose a list of external devices using device control information backed up in the first storage or the second storage.

The device control information may be address information of an external device which is referred by the first program.

The controller, when the image forming apparatus is in a power saving mode, and a new external device is connected to the external interface or a connected external device is detached from the external interface, may convert an operation mode of the image forming apparatus to a normal mode.

The external interface may be Universal Serial Bus (USB) interface.

The first program may be a USB host driver, and the second program may be a program where a hub class driver, a mass storage class driver, and enumeration are removed from the USB host driver.

The pre-defined external device may be a wireless LAN apparatus.

The first storage and the second storage may be non-volatile memories.

The first storage may be a Dynamic Random Access Memory (DRAM), and the second storage may be a Static Random Access Memory (SRAM).

The method may further include an image forming unit which, when print data is received through the external interface, prints the received print data.

The controller, when the image forming apparatus is in a power saving mode and print data is received, may convert an operation mode of the image forming apparatus to a normal mode, and control the image forming unit to print the received print data.

An image forming apparatus which operates in a plurality of operation modes according to an exemplary embodiment includes a first storage where a first program to communicate with external interface is stored and operates when the image forming apparatus is in a normal mode, a second storage which operates when the image forming apparatus is in a power saving mode, and a controller which, when it is necessary to convert an operation mode of the image forming apparatus to a power saving mode, extracts and stores device control information of the external device in the second storage, stores a second program with less capacity than the first program in the second storage, and converts an operation mode of the image forming apparatus to a power saving mode, and the controller, when an operation mode of the image forming apparatus is converted to a power saving mode, performs communication with the external interface using device control information stored in the second storage and the second program.

A method of connecting with an external device in an image forming apparatus which operates in a plurality of operation modes according to an exemplary embodiment includes determining an operation mode of the image forming apparatus, when the image forming apparatus operates in a normal mode, storing 'a first program to communicate with an external interface' in a first storage, when the image forming apparatus operates in a power saving mode, storing 'a second program to communicate with a pre-defined external device through the external interface' in a second storage, and performing communication with the external interface using the first program stored in the first storage and the second program stored in the second storage according to an operation mode of the image forming apparatus.

The performing communication may include, when the image forming apparatus operates in a normal mode, performing communication with the external interface using the first program stored in the first storage, and when the image forming apparatus operates in a power saving mode, performing communication with the external device using the second program stored in the second storage.

The method may further include determining whether an external device is connected to the external interface, and the storing the second program may include, when an external device is connected to the external interface, operating the second program in the second storage when an operation mode of the image forming apparatus is converted to a power saving mode.

The method may further include, when an external device is connected to the external interface, determining whether the connected external device is the pre-defined external device, and the storing the second program may include, when the connected external device is the pre-defined external device, storing the second program in the second storage when an operation mode of the image forming apparatus is converted to a power saving mode.

The method may further include, when the connected external device is the pre-defined external device, storing device information of the connected external device in the first storage or the second storage when an operation mode of the image forming apparatus is converted to a power saving mode.

The performing communication may include, when the image forming apparatus operates in a power saving mode, performing communication with the external device using the device information of an external device stored in the second storage and the second program.

The determining may be performed when the image forming apparatus operates in a normal mode.

The method may further include, when the image forming apparatus operates in a power saving mode, cutting off power supply to the first storage or operating the first storage in a self-refresh mode.

The performing communication may include, when an operation mode of the image forming apparatus is converted to a power saving mode, stopping communication with the external interface, and when the second program is stored in the first storage, resuming communication with the external interface using the second program stored in the second storage.

The method may further include, when an operation mode of the image forming apparatus is converted to power saving mode, backing up device control information of an external device connected to the external interface in the first storage or the second storage.

The method may further include, when an operation mode of the image forming apparatus is converted to a normal mode, composing a list of connected external devices using the device control information backed up in the first storage or the second storage.

The device control information may be address information of an external device which is referred by the first program.

The method may further include, when the image forming apparatus operates in a power saving mode, and when a new external device is connected to the external interface or a connected external device is detached from the external interface, converting an operation mode of the image forming apparatus to a normal mode.

The external interface may be Universal Serial Bus (USB) interface.

The first program may be a USB host driver, and the second program may be a program where a hub class driver, a mass storage class driver, and enumeration are removed from the USB host driver.

The first storage may be a Dynamic Random Access Memory (DRAM), and the second storage may be a Static Random Access Memory (SRAM).

The method may further include receiving print data through the external interface and printing the received print data.

The method may further include, when print data is received when the image forming apparatus operates in a power saving mode, converting an operation mode of the image forming apparatus to a normal mode.

A method of connecting an external device in an image forming apparatus which operates in a plurality of operation modes according to an exemplary embodiment includes, when it is necessary to convert an operation mode of the image forming apparatus to a power saving mode, extracting device control information of the connected external device and storing the device control information in a second storage which operates in a power saving mode, storing a second program with a smaller capacity than a first program which is provided to perform communication with the external interface when an operation mode of the image forming apparatus is a general mode, in the second storage, converting an operation mode of the image forming apparatus to a power saving mode, and performing communication with the external interface using the second program stored in the second storage and the stored device control information.

In a computer-readable recording medium including a program to execute a method for connecting with an external apparatus in an image forming apparatus which operates in a plurality of operation modes according to an exemplary embodiment, the method for connecting with an external apparatus includes determining an operation mode of the image forming apparatus, when the image forming apparatus operates in a normal mode, storing 'a first program to communicate with external interface' in a first storage, when the image forming apparatus operates in a power saving mode, storing 'a second program to communicate with a pre-defined external device through the external interface' in a second storage, and performing communication with the external interface using the first program stored in the first storage and the second program stored in the second storage according to an operation mode of the image forming apparatus.

A method of connecting an external interface of an image forming apparatus with an external device includes: storing a first program into a first storage of the image forming apparatus when a determination is made to operate in a normal mode; storing a second program with less capacity than the first program into a second storage of the image forming apparatus when a determination is made to operate in a power saving mode; and performing communication with the external device using either the first program in the first storage or the second program in the second storage based on the determination of which mode of operation to set the image forming apparatus.

In an exemplary embodiment, a determination is made to operate in a power saving mode when a pre-defined external device is determined to be connected to the image forming apparatus.

In an exemplary embodiment, the method further comprises, when the connected external device is determined to be a pre-defined external device, storing device information of the connected external device in the first storage or the second storage when an operation mode of the image forming apparatus is converted to a power saving mode.

In an exemplary embodiment, the performing communication comprises, when the image forming apparatus operates in a power saving mode, performing communication with the external device using the device information of the external device stored in the second storage and the second program.

In an exemplary embodiment, the method further comprises, when the image forming apparatus operates in a power saving mode, and subsequently a new external device is connected to the external interface or a connected external device is detached from the external interface, converting an operation mode of the image forming apparatus to a normal mode.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 8 is a flowchart provided to explain a process of converting a power saving mode to a normal mode; and FIG. 9 is a flowchart provided to explain a process of converting a normal mode to a power saving mode.

DETAILED DESCRIPTION OF THE PREFERRED EMBODIMENTS

Figure 1:
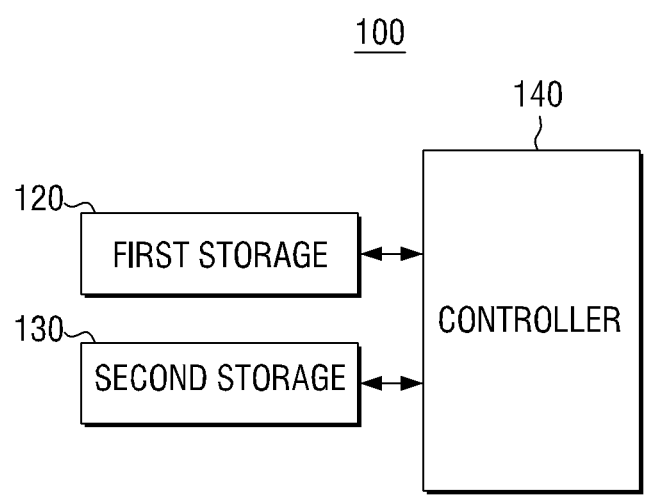
FIG. 1 is a block diagram illustrating configuration of an image forming apparatus briefly according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating configuration of an image forming apparatus briefly according to an exemplary embodiment of the present inventive concept.

Referring to FIG. 1, an image forming apparatus 100 according to an exemplary embodiment may consist of a first storage 120, a second storage 130, and a controller 140. The image forming apparatus 100 according to this exemplary embodiment may be a printer, a copier, a fax, and a MFP which combines the above functions in a single device.

Meanwhile, the image forming apparatus 100 includes a normal mode and a power saving mode. Herein, the normal mode refers to an operation mode where a printing job is performed or a printing operation is prepared. The power saving mode refers to an operation mode where power supply to a specific component is cut off or minimized in order to save power consumption when no job is being performed by the image forming apparatus 100. In this exemplary embodiment, the image forming apparatus 100 includes only the normal mode and the power saving mode as operation modes of the image forming apparatus 100, but the image forming apparatus 100 may include operation modes other than the above-described normal mode and the power saving mode.

The first storage 120 is a volatile memory, and stores a first program. Specifically, the first storage 120 may be a Dynamic Random Access Memory (DRAM), and when the image forming apparatus 100 is in the normal mode, the first program which is pre-stored in a third storage 110 is stored in the first storage 120. Herein, the first program is a program to communicate with an external device (specifically, an external interface), which is a USB host driver.

In this case, the external interface may be Universal Serial Bus (USB) interface, and the pre-defined external device may be a wireless LAN apparatus. The USB device may be provided in the controller 140 or in a communication interface 150 which will be described later. Hereinafter, it is assumed that the USB interface (hereinafter, referred to as an 'external interface') is provided in the controller 140 and the communication interface 150 except for the USB interface (for example, a wired LAN) is provided separately for convenience of explanation. Meanwhile, in the above exemplary embodiment, only a wireless LAN apparatus is used as an external device, but other communication apparatuses, such as a USB hub, may be used as an external device. In the above description, only one external device is connected, but a plurality of external devices may be connected depending on exemplary embodiments herein.

In addition, the first storage 120 may store a program which is necessary to operate the image forming apparatus 100 in a normal mode, in addition to the first program. When the image forming apparatus 100 is in a power saving mode, the first storage 120 may operate in a self-refresh mode, or power supply to the first storage 120 may be cut off.

Further, the first storage 120 stores print data. Specifically, the first storage 120 may store print data received from the communication interface 150, which will be explained later, or the controller 140.

In addition, the first storage 120 stores device control information of an external device which is connected to the external interface. Specifically, when the operation mode of the image forming apparatus 100 is restored to the normal mode from the power saving mode, the first storage 120 may back up the device control information so that the current device control information may be used continuously without a device enumeration process. Herein, the device control information represents a data structure such as Queue Head and Transfer Descriptor which are defined in a host controller interface (HCI, EHCI, OHCI, etc.) and an address of device control information which is referred by a host controller (for example, a register value of Asynchronous List Address and Periodic List Address in the case of EHCI). In general, when the first storage 120 is self-refreshed, the data structure stored in the first storage 120 is preserved, and thus only the address of the device control information referred by a host controller from among device control information may be backed up in order to reduce the back-up size, according to an exemplary embodiment.

The second storage 130 is a volatile memory, and stores a second program. Specifically, the second storage 130 may be a Static Random Access Memory (SRAM), and when the image forming apparatus 100 is in a power saving mode, the second program, which is pre-stored in the third storage 110, is stored in the second storage 130. Herein, the second program is a program to communicate with a pre-defined external device, and a program where a hub class driver, a mass storage class driver, and enumeration are removed from the above-described USB host driver. The specific structures of the first and second programs will be explained later with reference to FIG. 6.

More specifically, when an external device connected to an external interface is a wireless LAN apparatus, and communication with the connected external device needs to be maintained even in a power saving mode, the second storage 130 stores the second program which is stored in the third storage 110. In addition, the second storage 130 stores a program which is necessary to operate the image forming apparatus 100 in the power saving mode in addition to the second program.

Meanwhile, when the image forming apparatus 100 operates in a normal mode, when the image forming apparatus 100 operates in a power saving mode but no external device is connected to the external interface, or when the image forming apparatus 100 operates in a power saving mode but an external device other than a wireless LAN (for example, a mobile storage medium) is connected to the external interface, the second storage 130 may not store the second program, or even if the second program may be stored in the second storage 130, it may not be operated.

The second storage 130 may include a common memory area. Herein, the common memory area refers to an area where device information regarding a currently-connected external device (specifically, a class type which belongs to a device function scope and a communication method such as Control, Bulk, and Interrupt) is stored.

The controller 140 may perform communication with an external interface. Specifically, the controller 140 may perform communication depending on an operation mode of an image forming apparatus. That is, when the image forming apparatus 100 is in a normal mode, the controller 140 may perform communication with an external interface using the first program stored in the first storage 120, and when the image forming apparatus 100 is in a power saving mode, the controller 140 may perform communication with an external device using the second program stored in the second storage 130. The specific operations of the controller 140 will be explained with reference to FIG. 2.

Figure 2:
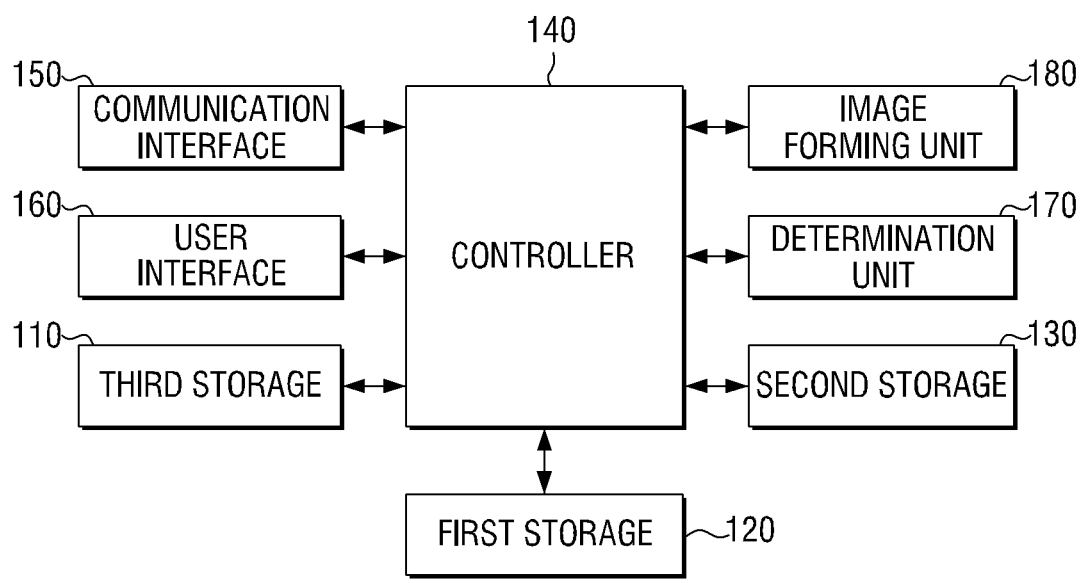
FIG. 2 is a block diagram illustrating configuration of an image forming apparatus in detail according to an exemplary embodiment.

In the above exemplary embodiment, only a brief configuration of the image forming apparatus 100 has been explained, but the image forming apparatus 100 may further comprise the configuration illustrated in FIG. 2. Hereinafter, an exemplary configuration of the image forming apparatus 100 will be explained in detail with reference to FIG. 2.

FIG. 2 is a block diagram illustrating a configuration of an image forming apparatus in detail according to an exemplary embodiment.

Referring to FIG. 2, the image forming apparatus 100 according to this exemplary embodiment comprises the third storage 110, the first storage 120, the second storage 130, the controller 140, the communication interface 150, user interface 160, a determination unit 170, and an image forming unit 180.

Since the operations of the first storage 120 and the second storage 130 are the same as those in FIG. 1, further description will not be provided.

The third storage is a non-volatile memory (specifically, HDD, flash memory, etc.), and stores the first program and the second program. Herein, the first program is a program to communicate with an external device (specifically, an external interface), and is a USB host driver. The second program is a program to communicate with a pre-defined external device, and is a program where a hub class driver, a mass storage class driver, and enumeration are removed from the above-described USB host driver.

The third storage 110 stores a program to operate the image forming apparatus 100 including the first program in a normal mode and a program to operate the image forming apparatus 100 including the second program in a power saving mode. In the normal mode, the first program pre-stored in the third storage 110 is stored in the first storage 120, and in the power saving mode, the second program pre-stored in the third storage 110 is stored in the second storage 130.

The communication interface 150 is formed to connect the image forming apparatus 100 to a print control terminal device (not shown), and may be connected not only through a Local Area Network (LAN) or Internet network, but also through a wireless communication method (for example, GSM, UMTS, LTE, etc.).

Meanwhile, in the above exemplary embodiment, the controller 140 communicates with the external interface (USB interface), but a port to connect to the USB interface physically may be provided in the communication interface 150. In addition, communication with the external interface may be performed in the communication interface 150, and the communication may be controlled by the controller 140.

In addition, the communication interface 150 may receive job data (for example, print data and fax transmission data) from a print control terminal device (not shown), and transmit job data generated by the image forming apparatus 100 (for example, scan data, fax reception data) to the print control terminal device. Herein, the print data may be data in a printer language such as Postscript (PS), Printer Control Language (PCL), and so on, and when the image forming apparatus 100 supports direct-printing, the print data may be a file itself, such as PDF, XPS, BMP, JPG, etc.

A user interface 160 includes a plurality of function keys through which a user may set or select various functions supported by the image forming apparatus 100, and displays various information provided by the image forming apparatus 100. Meanwhile, the user interface 160 may be realized as an apparatus such as a touch pad, which may perform input and output operations simultaneously, or as an apparatus which combines a plurality of buttons and a monitor.

The determination unit 170 determines whether an external device is connected to an external interface. Specifically, the determination unit 170 may determine whether an external device is connected to an external interface, and when an external device is determined to be connected, the determination unit 170 may also determine whether the connected external device is a pre-defined external device.

Herein, the pre-defined external device is a wireless LAN apparatus. Specifically, such an apparatus, as a memory stick, is not used in a power saving mode, but a wireless LAN is used to perform communication periodically in order to provide state (current status) information of the image forming apparatus 100 to a print control terminal apparatus (not shown) and thus, the determination unit 170 may perform the operation of determining whether the external device connected to an external interface is an external device such as a wireless LAN. Such an operation of the determination unit 170 may be performed by the first program. That is, the determination operation of the determination unit 170 may be performed when the operation mode of the image forming apparatus 100 is a normal mode.

The image forming unit 180 may output print data. Specifically, the image forming unit 180 may perform a print job with respect to print data received through the communication interface 150 or the controller 140 or print data pre-stored in the first storage 120.

Meanwhile, in the above exemplary embodiment, it is illustrated and explained that the image forming apparatus 100 only comprises the image forming unit 180 which performs a print job, but if the image forming apparatus 100 supports fax transmission and fax reception functions, the image forming apparatus 100 may comprise a fax processor, and if the image forming apparatus 100 supports a scan function, the image forming apparatus 100 may further comprise a scan processor.

The controller 140 controls each component of the image forming apparatus 100. Specifically, when a print job is received through the communication interface 150 or through the external interface, the controller 140 may control the image forming unit 180 to perform the received print job.

In addition, the controller 140 may determine an operation mode of an image forming apparatus. Specifically, the controller 140 may determine whether there is a print job, and how much time has been elapsed after a print job, etc., and determine whether the image forming apparatus is to be in a power saving mode or in a normal mode.

When the operation mode of the image forming apparatus 100 is a power saving mode, if a new external device is connected to an external interface, a previously attached external device is detached, or print data is received through an external interface, the controller 140 may convert the current operation mode to a normal mode.

In addition, the controller 140 may control each component of the image forming apparatus 100 to have an operation state corresponding to a determined operation mode. Specifically, when the operation mode of the image forming apparatus 100 should be converted from a normal mode to a power saving mode, the controller 140 may control such that communication with an external interface using the first program stored in the first storage 120 is stopped (that is, an operation of a scheduler is stopped and a USB interrupt is turned off), device control information of a device connected to an external interface is backed up in the first storage 120 or the second storage 130, device information (specifically, a class type which belongs to a device function scope and a communication method such as Control, Bulk, Interrupt, etc.) of the connected external apparatus (that is, a wireless LAN apparatus) is stored in a pre-defined area of the second storage 130, the second program pre-stored in the third storage 110 is stored in the second storage 130, communication with the connected external device is resumed using the second program stored in the second storage 130, and power supply to the first storage 120 is cut off or the first storage 120 is operated in a self-refresh mode.

In addition, when the operation mode of the image forming apparatus 100 should be converted from a power saving mode to a normal mode, communication with an external interface using the second program stored in the second storage 130 may be stopped, the first program stored in the third storage 110 may be stored in the first storage 120, and communication with the external device may be resumed using the device control information backed up in the first storage 120 or the second storage 130 and the first program stored in the first storage 120.

As described above, the image forming apparatus 100 according to an exemplary embodiment may communicate with an external interface using the second program which has a small capacity in a power saving mode. Accordingly, power consumption in the first storage (DRAM) may be reduced in a power saving mode.

Meanwhile, in the above description with reference to FIG. 2, the controller 140 and the communication interface 150 are described as separate components, but the functions of the controller and the communication interface may be realized as one configuration (for example, SoC). In addition, the functions of the controller and the first storage may be realized as one configuration.

Meanwhile, in the above description with reference to FIG. 2, the controller 140 is described as one configuration, but the controller 140 may consist of a plurality of configurations depending on exemplary embodiments. For example, the controller 140 may be configured to further comprise an auxiliary controller which operates only in a power saving mode.

Figure 3:
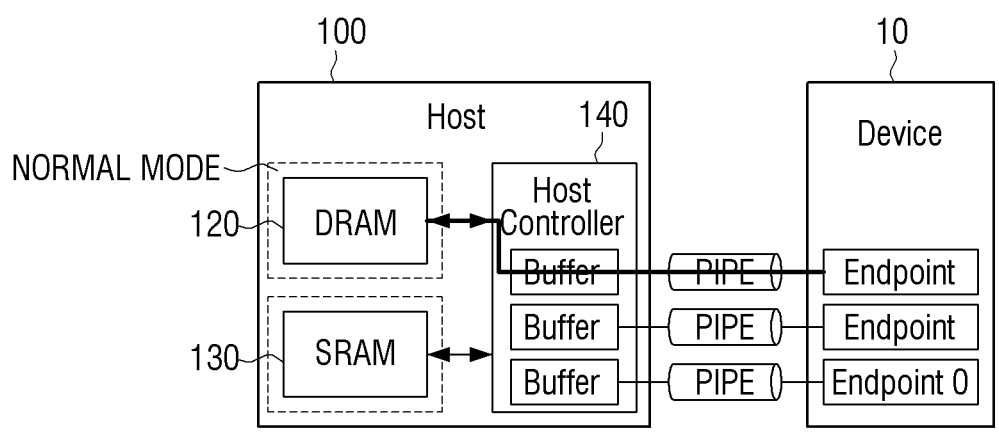
FIGS. 3 and 4 are block diagrams provided to explain communication with an external device depending on an operation mode of an image forming apparatus according to an exemplary embodiment.
Figure 4:
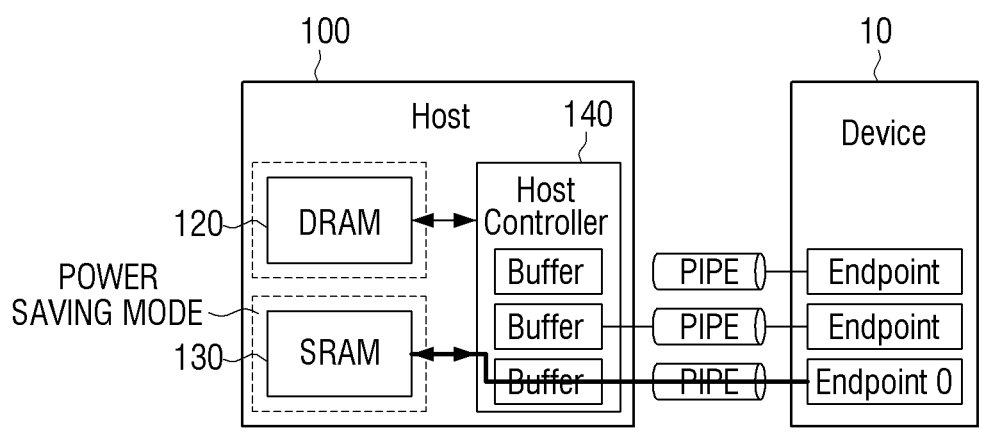

FIGS. 3 and 4 are block diagrams provided to explain communication with an external device depending on an operation mode of an image forming apparatus according to an exemplary embodiment.

Specifically, FIG. 3 is a block diagram provided to explain communication with an external device when an image forming apparatus is in a normal mode, and FIG. 4 is a block diagram provided to explain communication with an external device when an image forming apparatus is in a power saving mode.

Referring to FIG. 3, when an image forming apparatus is in a normal mode, the first program is stored in the first storage 120, and the controller 140 performs communication with an external device (various apparatuses using a USB method) using the first program stored in the first storage 120. In this case, the second storage 130 does not operate. That is, power supply to the second storage 130 may be cut off.

Referring to FIG. 4, when an image forming apparatus is in a power saving mode, the second program is stored in the second storage 130, and the controller 140 performs communication with a pre-defined external device (a wireless LAN using a USB method) using the second program stored in the second storage 130. In this case, power supply to the first storage 120 is cut off, but the first storage 120 may operate in a self-refresh mode.

Figure 5:
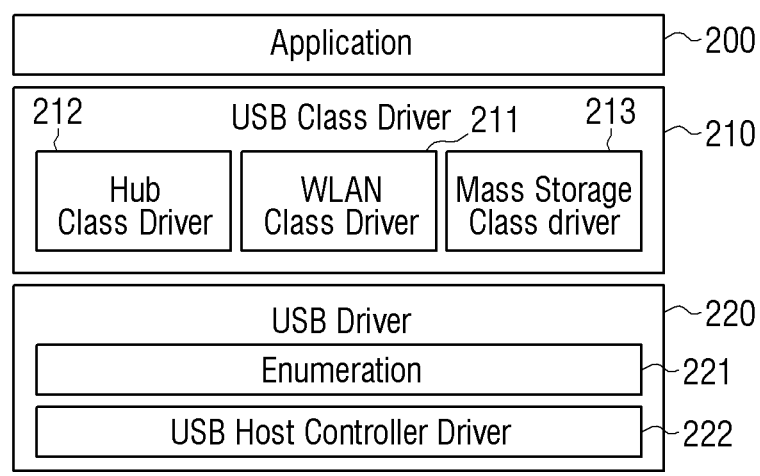
FIG. 5 is a view illustrating a structure of a general USB host program.

FIG. 5 is a view illustrating a structure of a general USB host program.

Referring to FIG. 5, a general USB host program 200 comprises a USB class driver 210 and a USB driver 220.

The USB class driver 210 is a program area to control a USB apparatus. The USB class driver 210 includes a WLAN class driver 211, a hub class driver 212, and a mass storage class driver 213 depending on the type of USB apparatus.

The WLAN class driver 211 is a program area to control a wireless LAN apparatus when a connected USB apparatus is a wireless LAN apparatus.

The hub class driver 212 is a program area to control a hub apparatus when a connected USB apparatus is a hub apparatus.

The mass storage class driver 213 is a program area to control a storage medium when a connected USB apparatus is a storage medium.

The USB driver 220 is a program area to interface with a connected USB apparatus. The USB driver 220 includes an enumeration 221 and a USB host controller driver 222.

The enumeration 221 is a protocol area to identify a connected USB apparatus.

The USB host controller driver 222 is a program area to control hardware.

As such, the conventional USB host program 200 has a large capacity since it is stacked in SRAM (128 KB) to perform communication with various USB apparatuses.

However, a memory stick is not used and only a wireless module is used when an image forming apparatus is in a power saving mode and thus, the hub class driver 212 and the mass storage class driver 213 are not necessary in the USB class driver 210. In this regard, the second program according to an exemplary embodiment includes only a wireless LAN class driver in the USB class driver 210. As such, by removing the hub class driver 212 and the mass storage class driver 213 from the USB class driver 210, the second program according to an exemplary embodiment may reduce its capacity as much as 60% in comparison with the general USB host program 200.

In addition, as it is not necessary to identify a USB apparatus in a power saving mode, that is, information identified in a normal mode may be used in the power saving mode, the second program according to an exemplary embodiment includes an additional module 431 which brings the information identified in the normal mode. Accordingly, it is not necessary for the second program to include the enumeration 221 of the USB driver 220.

The structures of the first program and the second program according to an exemplary embodiment will be explained with reference to FIG. 6.

Figure 6:
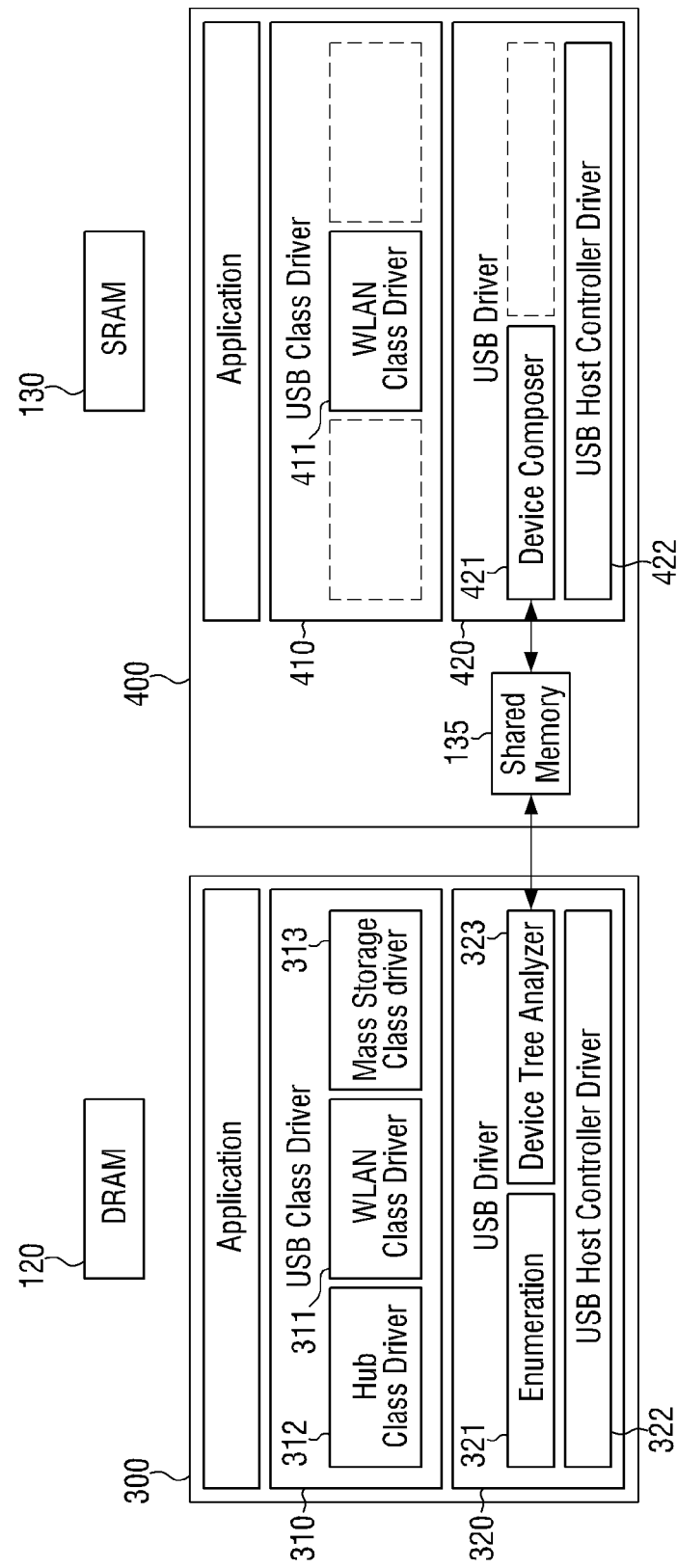
FIG. 6 is a view illustrating structures of a first program and a second program according to an exemplary embodiment.

FIG. 6 is a view illustrating structures of the first program and the second program according to an exemplary embodiment.

Referring to FIG. 6, a first program 300 is the same as the conventional USB host program illustrated in FIG. 5 except that a device tree analyzer 323 is added to a USB driver 320.

The first program 300 comprises a USB class driver 310 and a USB driver 320.

The USB class driver 310 is a program area to control an USB apparatus. Specifically, the USB class driver 310 includes a WLAN class driver 311, a hub class driver 312, and a mass storage class driver 313 depending on the type of USB apparatus.

The WLAN class driver 311 is a program area to control a wireless LAN apparatus when a connected USB apparatus is a wireless LAN apparatus.

The hub class driver 312 is a program area to control a hub apparatus when a connected USB apparatus is a hub apparatus.

The mass storage class driver 313 is a program area to control a storage medium when a connected USB apparatus is a storage medium.

The USB driver 320 is a program area to interface with a connected USB apparatus. The USB driver 320 includes an enumeration 321, a USB host controller driver 322, and a device tree analyzer 323.

The enumeration 321 is a protocol area to identify a connected USB apparatus.

The USB host controller driver 322 is a program area to control hardware.

The device tree analyzer 323 is a program area to determine whether an external device is connected to an external interface. The specific operations of the device tree analyzer 323 are the same as those of the above-described determination unit 170, and thus a further description will not be provided.

A second program 400 includes a USB class driver 410 and a USB driver 420.

The USB class driver 410 is a program area to control a connected USB apparatus. Specifically, the second program 400 includes only a WLAN class driver 411 in the USB class driver 310.

The WLAN class driver 411 is a program area to control a wireless LAN apparatus when a connected USB apparatus is a wireless LAN apparatus.

The USB driver 420 is a program area to interface with a connected USB apparatus. The USB driver 420 includes a device composer 421 and a USB host controller driver 422.

The device composer 421 identifies a connected external device using device information stored in a common (or shared) memory 135.

The USB host controller driver 422 is a program area to control hardware.

As described above, the second program 400 according to an exemplary embodiment does not include the hub class driver 212, the mass storage class driver 213, and the enumeration 221 in the general USB host program, and thus can be reduced in size.

Figure 7:
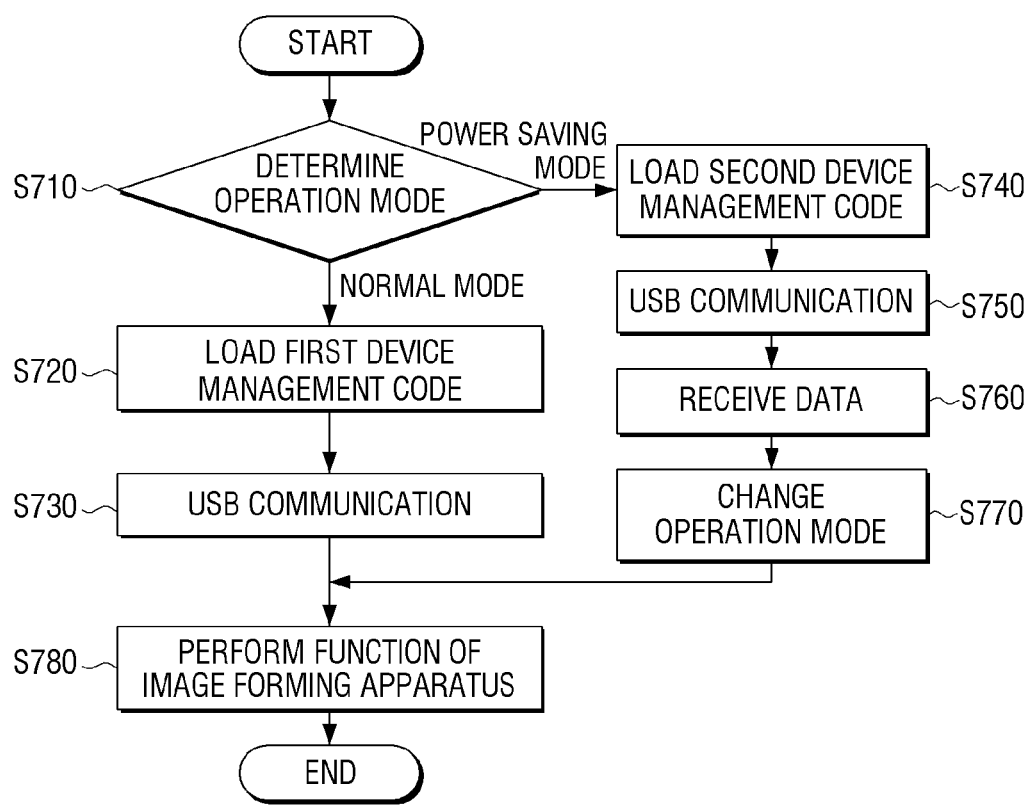
FIG. 7 is a flowchart provided to explain a method of connecting with an external device according to an exemplary embodiment.

FIG. 7 is a flowchart provided to explain a method of connecting with an external device (or a network connecting method) according to an exemplary embodiment.

Referring to FIG. 7, first of all, an operation mode of an image forming apparatus is determined at operation S710. Specifically, it is determined whether there is a print job, and how much time has elapsed after a print job, etc., so that whether the image forming apparatus is to be in a power saving mode or a normal mode may be determined.

When an image forming apparatus operates in a normal mode, the first program to communicate with an external interface pre-stored in the third storage is stored in the first storage (operation S720).

In addition, when an image forming apparatus operates in a normal mode, communication with an external interface is performed using the first program stored in the first storage (operation S730).

Meanwhile, when an image forming apparatus operates in a power saving mode, the second program to perform communication with a pre-defined external device pre-stored in the third storage is stored in the second storage (operation S740). Meanwhile, depending on exemplary embodiments, whether an external device is connected to an external interface, and when it is connected, whether the connected external device is a pre-defined external device may be determined before the second program is stored in the second storage.

Meanwhile, when an image forming apparatus receives print data through an external interface when it is in a power saving mode (operations S750 and S760), the operation mode of the image forming apparatus is converted to a normal mode (operation S770). The operation of converting the state (operation mode) of the image forming apparatus will be explained later with reference to FIG. 8 and FIG. 9.

On the other hand, when an image forming apparatus receives print data when it is in a normal mode, the received print data is printed without changing the operation mode (operation S780).

As described above, the communication method according to an exemplary embodiment allows communication with an external interface using the second program having a small capacity in the power saving mode. Accordingly, in the power saving mode, power consumption of the first storage (DRAM) may be reduced. The communication method of FIG. 7 may be performed in an image forming apparatus having the configuration of FIG. 1 or FIG. 2, but may alternatively be performed in an image forming apparatus having other configurations.

In addition, the above-described method of connecting with an external device may be realized as at least one execution program to execute the above-described method of connecting with an external device, and such an execution program may be stored in a computer-readable recording medium.

Accordingly, each block of the exemplary embodiment may be realized as a computer-recordable code on a computer-readable recording medium. The computer-readable recording medium may be a device which can store data readable by a computer system.

FIG. 8 is a flowchart provided to explain a process of converting a power saving mode to a normal mode.

Referring to FIG. 8, when the operation mode of the image forming apparatus 100 should be changed from a normal mode to a power saving mode (operation S805), communication with an external interface using the first program stored in the first storage 120 is stopped (operation S810). Specifically, the operation of a scheduler may be stopped and a USB interrupt may be turned off.

In addition, it is determined whether an external device is connected to an external interface, and when an external device is determined to be connected, it is determined whether the connected external device is a pre-defined external device (that is, a wireless LAN apparatus). If the connected external device is the pre-defined external device, the device information of the connected external device (that is, a wireless LAN apparatus) (specifically, a class type which belongs to a device function scope and a communication method such as Control, Bulk and Interrupt) may be extracted (operation S815).

Further, the device information of the device connected to the external interface may be backed up in the first storage 120 or the second storage 130, and the device information of the connected external device (that is, a wireless LAN apparatus) (specifically, a class type which belongs to a device function scope and a communication method such as Control, Bulk and Interrupt) may be stored in a pre-defined area of the second storage 130 (operation S820).

Subsequently, the operation mode of the image forming apparatus is converted to a power saving mode (operation S825). Specifically, the image forming apparatus may be controlled such that the second program pre-stored in the third storage 110 is stored in the second storage 130, and power supply to the first storage 120 is cut off, or the first storage 120 is operated in a self-refresh mode.

In addition, device control information may be composed using the device information stored in the pre-defined area of the second storage 130 (operations S830 and S835), and communication with the connected external device may start using the second program stored in the second storage 130 (operation S840).

Subsequently, communication with the external device is performed using the second program (operation S845), and it may be subsequently sensed whether an event satisfying a condition for normal mode conversion occurs (operation S850). Specifically, when print data is received from an external device, the operation state of the image forming apparatus 100 may be converted to a normal mode (operation S855), which will be explained with reference to FIG. 9.

FIG. 9 is a flowchart provided to explain a process of converting a normal mode to a power saving mode.

Referring to FIG. 9, when the operation mode of the image forming apparatus 100 should be changed from a power saving mode to a normal mode (operation S910), communication with an external interface using the second program stored in the second storage 130 may be stopped (operation S920). Specifically, an operation of a scheduler may be stopped and a USB interrupt may be turned off.

Subsequently, the operation mode of the image forming apparatus is converted (operation S930). Specifically, the operation mode of the image forming apparatus may be converted from a power saving mode to a normal mode.

When the power of the first storage 120 is cut off, when the first program stored in the third storage 110 is stored in the first storage 120, or when the first storage 120 is in a self-refresh mode, the first program of the first storage 120 may be operated again and the device control information backed up in the third storage 110 may be restored (operation S940).

In addition, communication with the external device may be resumed using the restored device control information and the first program stored in the first storage 120 (operation S950).

In addition, communication with the external device may be performed using the first program (operation S960), and it may be subsequently sensed whether a condition for conversion to a power saving mode is satisfied (operation S970). Specifically, when a predetermined time elapses after a print job is performed, the operation state of the image forming apparatus 100 may be converted to a power saving mode (operation S980).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus which operates in a plurality of operation modes, comprising:
    a first storage to store a first program to communicate with an external interface when the image forming apparatus operates in a normal mode;
    a second storage to store a second program which is smaller than the first program in size in order to perform communication with a pre-defined external device through the external interface when the image forming apparatus operates in a power saving mode; and
    a controller which performs communication with the external interface using the first program stored in the first storage and the second program stored in the second storage according to an operation mode of the image forming apparatus,
    wherein
    the controller, when the image forming apparatus is in the power saving mode, and an external device is connected to the external interface, determines whether the connected external device is a new external device, converts the operation mode of the image forming apparatus to the normal mode when the controller determines the connected external device is a new external device, and maintains the operation mode of the image forming apparatus in the power saving mode when the controller determines the connected external device is not the new external device, and
    the controller determines the connected external device is the new external device when device information corresponding to the connected external device is not stored in the image forming apparatus and determines the connected external device is not the new external device when the device information corresponding to the connected external device is stored in the image forming apparatus.

2. The apparatus as claimed in claim 1,
    wherein the controller, when the image forming apparatus is in the normal mode, performs communication with the external interface using the first program stored in the first storage, and
    wherein the controller, when the image forming apparatus is in the power saving mode, performs communication with the connected external device using the second program stored in the second storage.

3. The apparatus as claimed in claim 1, further comprising:
    a determination unit which determines whether the external device is connected to the external interface,
    wherein the controller, when the external device is determined to be connected to the external interface, stores the second program in the second storage when the operation mode of the image forming apparatus is converted to the power saving mode.

4. The apparatus as claimed in claim 3,
    wherein the determination unit, when the external device is connected to the external interface, determines whether the connected external device is the pre-defined external device, and
    wherein the controller, when the connected external device is the pre-defined external device, operates the second program in the second storage when the operation mode of the image forming apparatus is converted to the power saving mode.

5. The apparatus as claimed in claim 4, wherein the controller, when the connected external device is the pre-defined external device, stores device information of the connected external device in the second storage when the operation mode of the image forming apparatus is converted to the power saving mode.

6. The apparatus as claimed in claim 5, wherein the controller, when the image forming apparatus is in the power saving mode, performs communication with the connected external device using the device information of the connected external device stored in the second storage and the second program.

7. The apparatus as claimed in claim 3, wherein the determination unit determines whether the external device is connected to the external interface when the image forming apparatus is in the normal mode.

8. The apparatus as claimed in claim 1, wherein the controller, when the image forming apparatus is in the power saving mode, cuts off power to the first storage, or controls to operate the first storage in a self-refresh mode.

9. The apparatus as claimed in claim 1, further comprising:
    a third storage which is a non-volatile storage and to store the first program and the second program,
    wherein the controller, when the operation mode of the image forming apparatus is converted to the power saving mode, stops communication with the external interface, stores the second program pre-stored in the third storage in the second storage, and resumes communication with the external interface using the second program stored in the second storage.

10. The apparatus as claimed in claim 1, wherein the controller, when the operation mode of the image forming apparatus is converted to the power saving mode, backs up device control information of the connected external device in the first storage or the second storage.

11. The apparatus as claimed in claim 10, wherein the controller, when the operation mode of the image forming apparatus is converted to the normal mode, composes a list of external devices using the device control information backed up in the first storage and the second storage.

12. The apparatus as claimed in claim 11, wherein the device control information includes address information which is referred to by the first program.

13. The apparatus as claimed in claim 1, wherein the external interface is Universal Serial Bus (USB) interface, wherein the first program is a USB host driver, and
wherein the second program is a program where a communication programs regarding external devices except for the pre-defined external devices are removed from the USB host driver.

14. The apparatus as claimed in claim 1, further comprising:
an image forming unit which, when print data is received through the external interface, prints the received print data, wherein the controller, when the image forming apparatus is in the power saving mode and print data is received, converts the operation mode of the image forming apparatus to the normal mode, and controls the image forming unit to print the received print data.

15. The apparatus as claimed in claim 1,
wherein the first program includes a program including a USB host driver, and
the second program is a program where at least one of a hub class driver, mass storage class driver, and enumeration are removed from the USB host driver.

16. The apparatus as claimed in claim 1, wherein the controller, when the image forming apparatus operates in the normal mode, cuts off a power supply to the second storage.

17. An image forming apparatus which operates in a plurality of operation modes, comprising:
a first storage where a first program to communicate with external interface is stored and operates when the image forming apparatus is in a normal mode;
a second storage which operates when the image forming apparatus is in a power saving mode; and
a controller which, when it is necessary to convert an operation mode of the image forming apparatus to a power saving mode, extracts and stores device control information of the one or more external devices in the second storage, stores a second program with less capacity than the first program in the second storage, and converts the operation mode of the image forming apparatus to the power saving mode,
wherein the controller, when the operation mode of the image forming apparatus is converted to the power saving mode, performs communication with the external interface using the device control information stored in the second storage and the second program, and
wherein the controller, when the image forming apparatus is in the power saving mode, and an external device is connected to the external interface, determines whether the connected external device is a new external device, converts the operation mode of the image forming apparatus to the normal mode when the controller determines the connected external device is a new external device, and maintains the operation mode of the image forming apparatus in the power saving mode when the controller determines the connected external device is not the new external device, and
the controller determines the connected external device is the new external device when device information corresponding to the connected external device is not stored in the image forming apparatus and determines the connected external device is not the new external device when the device information corresponding to the connected external device is stored in the image forming apparatus.

18. A method of connecting with an external device in an image forming apparatus which operates in a plurality of operation modes, comprising:
determining an operation mode of the image forming apparatus;
when the image forming apparatus operates in a normal mode, storing a first program to communicate with an external interface in a first storage;
when the image forming apparatus operates in a power saving mode, storing a second program to communicate with a pre-defined external device through the external interface in a second storage; and
performing communication with the external interface using the first program stored in the first storage or the second program stored in the second storage according to the operation mode of the image forming apparatus,
wherein:
when the image forming apparatus operates in the power saving mode and an external device is connected to the external interface, determining whether the connected external device is a new external device, converting the operation mode of the image forming apparatus to the normal mode when the determining determines the connected external device is a new external device, and maintaining the operation mode of the image forming apparatus in the power saving mode when the determining determines the connected external device is not the new external device, and
the determining whether the connected external device is the new external device comprises:
determining the connected external device is the new external device when device information corresponding to the connected external device is not stored in the image forming apparatus, and
determining the connected external device is not the new external device when the device information corresponding to the connected external device is stored in the image forming apparatus.

19. The method as claimed in claim 18, wherein the performing communication comprises, when the image forming apparatus operates in the normal mode, performing communication with the external interface using the first program stored in the first storage, and
when the image forming apparatus operates in the power saving mode, performing communication with the external device using the second program stored in the second storage.

20. The method as claimed in claim 18, further comprising:
determining whether the external device is connected to the external interface, wherein the storing the second program comprises, when the external device is connected to the external interface, operating the second program in the second storage when the operation mode of the image forming apparatus is converted to the power saving mode.

21. The method as claimed in claim 20, further comprising:
when the external device is connected to the external interface, determining whether the connected external device is the pre-defined external device,
wherein the storing the second program comprises, when the connected external device is the pre-defined external device, storing the second program in the second storage when the operation mode of the image forming apparatus is converted to the power saving mode.

22. The method as claimed in claim 21, further comprising:
when the connected external device is the pre-defined external device, storing device information of the connected external device in the first storage or the second storage when the operation mode of the image forming apparatus is converted to the power saving mode.

23. The method as claimed in claim 18, further comprising:
when the operation mode of the image forming apparatus is converted to the power saving mode, backing up device control information of the connected external device in the first storage or the second storage when the operation mode of the image forming apparatus is converted to the normal mode, and
composing a list of connected external devices using the device control information backed up in the first storage or the second storage.

24. The method as claimed in claim 20, wherein the determining is performed when the image forming apparatus operates in the normal mode.

25. The method as claimed in claim 18, wherein the performing communication comprises, when the operation mode of the image forming apparatus is converted to the power saving mode, stopping communication with the external interface, and when the second program is stored in the second storage, resuming communication with the external interface using the second program stored in the second storage.

* * * * *

UNITED STATES PATENT AND TRADEMARK OFFICE
CERTIFICATE OF CORRECTION

PATENT NO. : 9,547,504 B2
APPLICATION NO. : 13/933149
DATED : January 17, 2017
INVENTOR(S) : Sung-uk Bin et al.

It is certified that error appears in the above-identified patent and that said Letters Patent is hereby corrected as shown below:

In the Claims

Column 17, Line 54, Claim 17:
After "of" delete "the", therefor.

Signed and Sealed this
Seventh Day of March, 2017

Michelle K. Lee
*Director of the United States Patent and Trademark Office*